(12) United States Patent
Gehin

(10) Patent No.: US 10,552,203 B2
(45) Date of Patent: *Feb. 4, 2020

(54) SYSTEMS AND METHODS FOR REORDERING SEQUENTIAL ACTIONS

(71) Applicant: Landmark Graphics Corporation, Houston, TX (US)

(72) Inventor: Maurice Christopher Gehin, Houston, TX (US)

(73) Assignee: Landmarks Graphics Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/016,570

(22) Filed: Jun. 23, 2018

(65) Prior Publication Data

US 2018/0349172 A1 Dec. 6, 2018

Related U.S. Application Data

(63) Continuation of application No. 14/647,014, filed on May 22, 2015, now Pat. No. 10,007,550.

(51) Int. Cl.
| | |
|---|---|
| *G06F 9/48* | (2006.01) |
| *G06F 9/52* | (2006.01) |
| *G06F 9/50* | (2006.01) |
| *G06Q 10/06* | (2012.01) |

(52) U.S. Cl.
CPC ........... *G06F 9/48* (2013.01); *G06F 9/4843* (2013.01); *G06F 9/4881* (2013.01); *G06F 9/50* (2013.01); *G06F 9/52* (2013.01); *G06Q 10/06* (2013.01); *G06Q 10/063* (2013.01); *G06Q 10/0633* (2013.01)

(58) Field of Classification Search
CPC ........ G06F 9/48; G06F 9/4843; G06F 9/4881; G06F 9/50; G06F 10/06; G06F 10/063; G06F 10/0633
See application file for complete search history.

(56) References Cited

U.S. PATENT DOCUMENTS

| | | | |
|---|---|---|---|
| 5,475,843 A | 12/1995 | Halviatti et al. | |
| 5,757,480 A | 5/1998 | Shimanaka et al. | |
| 5,786,814 A | 7/1998 | Moran et al. | |
| 6,226,785 B1 | 5/2001 | Peterson et al. | |
| 6,336,149 B1 | 1/2002 | Preston et al. | |
| 6,532,023 B1 | 3/2003 | Schumacher et al. | |
| 6,802,052 B1 | 10/2004 | Andrews et al. | |
| 7,139,978 B2 | 11/2006 | Rojewski et al. | |
| 7,587,668 B2 | 9/2009 | Bala et al. | |

(Continued)

FOREIGN PATENT DOCUMENTS

| | | |
|---|---|---|
| EP | 567699 | 11/1993 |
| WO | 2012079087 | 6/2012 |

OTHER PUBLICATIONS

U.S. Appl. No. 14/647,014, "Final Office Action", dated Jan. 20, 2017, 10 pages.

(Continued)

*Primary Examiner* — Charles M Swift
(74) *Attorney, Agent, or Firm* — Kilpatrick Townsend & Stockton LLP

(57) ABSTRACT

Systems and methods for reordering sequential actions in a process or workflow by determining which actions are required to enable another action in the process or workflow.

20 Claims, 3 Drawing Sheets

(56) References Cited

U.S. PATENT DOCUMENTS

| | | | |
|---|---|---|---|
| 7,627,821 | B2 | 12/2009 | Klementiev et al. |
| 7,634,756 | B2 | 12/2009 | Bjornson et al. |
| 7,653,896 | B2 | 1/2010 | Herdeg et al. |
| 7,694,223 | B2 | 4/2010 | Corson |
| 7,783,927 | B2 | 8/2010 | Joshi et al. |
| 7,805,675 | B2 | 9/2010 | Cradick et al. |
| 7,937,243 | B2 | 5/2011 | Yen et al. |
| 7,970,884 | B1 * | 6/2011 | Castillo ................. G06F 9/50 709/201 |
| 8,191,005 | B2 | 5/2012 | Baier et al. |
| 8,387,066 | B1 | 2/2013 | Becher et al. |
| 2003/0142122 | A1 | 7/2003 | Straut et al. |
| 2005/0055246 | A1 | 3/2005 | Simon et al. |
| 2006/0005140 | A1 | 1/2006 | Crew et al. |
| 2006/0070025 | A1 | 3/2006 | Mauceri et al. |
| 2006/0143611 | A1 | 6/2006 | Sadiq |
| 2006/0262115 | A1 | 11/2006 | Shapiro et al. |
| 2007/0150429 | A1 | 6/2007 | Huelsman et al. |
| 2007/0299795 | A1 | 12/2007 | Macbeth et al. |
| 2008/0184250 | A1 | 7/2008 | Hamadi et al. |
| 2009/0037569 | A1 | 2/2009 | O'Loughlin et al. |
| 2009/0048896 | A1 | 2/2009 | Anandan et al. |
| 2009/0049108 | A1 | 2/2009 | Forde et al. |
| 2010/0023831 | A1 | 1/2010 | Kim et al. |
| 2010/0305991 | A1 | 12/2010 | Diao et al. |
| 2010/0333109 | A1 | 12/2010 | Milnor et al. |
| 2011/0225565 | A1 | 9/2011 | Van Velzen et al. |
| 2013/0247051 | A1 | 9/2013 | Sun et al. |
| 2013/0326537 | A1 | 12/2013 | Edelstein et al. |

OTHER PUBLICATIONS

U.S. Appl. No. 14/647,014, "Final Office Action", dated Oct. 20, 2017, 16 pages.
U.S. Appl. No. 14/647,014, "Final Office Action", dated Jun. 17, 2016, 9 pages.
U.S. Appl. No. 14/647,014, "Non-Final Office Action", dated Oct. 12, 2016, 10 pages.
U.S. Appl. No. 14/647,014, "Non-Final Office Action", dated Jan. 14, 2016, 11 pages.
U.S. Appl. No. 14/647,014, "Non-Final Office Action", dated Jun. 8, 2017, 12 pages.
U.S. Appl. No. 14/647,014, "Notice of Allowance", dated Feb. 28, 2018, 9 pages.
Australian Patent Application No. 2012395817, "First Examination Report", dated Jan. 20, 2016, 3 pages.
Australian Patent Application No. 2012395817, "Patent Application No.", Request to Amend a Complete Specification, dated Apr. 18, 2016, 20 pages.
Australian Patent Application No. 2012395817, "Second Examiner Report", dated May 6, 2016, 4 pages.
Australian Patent Application No. 2017200434, "First Examination Report", dated Aug. 24, 2017, 4 pages.
Australian Patent Application No. 2017200434, "Second Examination Report", dated Apr. 27, 2018, 3 pages.
Bausch et al., "BioOpera: Cluster-Aware Computing", Cluster Computing, Proceedings 2002 IEEE International Conference on, Sep. 26, 2002, pp. 1-8.
Canadian Patent Application No. 2,890,024, "Office Action", dated Apr. 28, 2017, 5 pages.
Canadian Patent Application No. 2,890,024, "Office Action", dated Mar. 14, 2018, 5 pages.
Ellis et al., "Modeling and enactment of workflow systems", Application and Theory of Petri Nets, Lecture Notes in Computer Science. vol. 691, 1993, pp. 1-16.
European Patent Application No. 12889015.9, "Extended European Search Report", dated Nov. 17, 2015, 5 pages.
Lassila, "A macro expansion approach to embedded processor code generation", IEEE Computer Society Press, 1996, 12 pages.
Memon, "Automatically Repairing Event Sequence-Based GUI Test Suites for Regression Testing", ACM Transactions on Software Engineering and Methodology (TOSEM), vol. 18, No. 2, Nov. 2008, 35 pages.
Mistry, "Imitate: Recording multi-threaded programs for trace analysis and deterministic replay", Jun. 2007, 76 pages.
International Patent Application No. PCT/US2012/67344, "International Preliminary Report on Patentability", dated Nov. 17, 2014, 16 pages.
International Patent Application No. PCT/US2012/67344, "International Search Report and Written Opinion", dated Feb. 5, 2013, 8 pages.
Reichert et al., "Supporting Adaptive Workflows in Advanced Application Environments", Mar. 1998, 10 pages.
Scaffidi et al., "Scenario-Based Requirements for Web Macro Tools", Symposium on Visual Languages and Human-Centric Computing, Sep. 23-27, 2007, p. 197.
Stallman, "A Program for Directing Recompilation", Gnu Make, Version 3.79, Apr. 2000, 161 pages.
Subhraveti et al., "Record and transplay: partial checkpointing for replay debugging across heterogeneous systems", SIGMETRiCS Performance Evaluation, Jun. 7, 11, 2011, pp. 109-120.
Uejio et al., "A structured history for command recall", Conference on System Sciences, vol. 2, 1991, pp. 494-507.
Wohlstadter, "Generating wrappers for command line programs: the Cai-Aggie Wrap-O-Matic project", Proceedings of the 23rd International Conference on Software Engineering, May 12-19, 2001, pp. 243-252.

* cited by examiner

SYSTEMS AND METHODS FOR REORDERING SEQUENTIAL ACTIONS

CROSS-REFERENCE TO RELATED APPLICATIONS

This is a continuation of U.S. patent application Ser. No. 14/647,014 (allowed), filed May 22, 2015, and entitled "Systems and Methods for Reordering Sequential Actions", which is a U.S. national phase under 35 U.S.C. 371 of International Patent Application No. PCT/US2012/067344, filed Nov. 30, 2012, and entitled "Systems and Methods for Reordering Sequential Actions", each of which are incorporated herein their entireties by this reference.

STATEMENT REGARDING FEDERALLY SPONSORED RESEARCH

Not applicable.

FIELD OF THE INVENTION

The present invention generally relates to systems and methods for reordering sequential actions. More particularly, the invention relates to reordering sequential actions in a process or workflow by determining which actions are required to enable another action in the process or workflow.

BACKGROUND OF THE INVENTION

Often workflows or processes in any particular industry involve a series of actions or steps that are performed sequentially to produce an end result. As a result, performing any action in the process or workflow other than the initial action, requires performing all sequential actions leading up to the selected action to perform. Because some actions are not required to perform other actions, the sequential repetition of all actions preceding the selected action is often inefficient and time consuming. In the following example, a process or workflow includes five actions represented by the following five sequential steps:
  Step 1: Read a file and produce object A;
  Step 2: Read a file and produce object B;
  Step 3: Read a file and produce object C;
  Step 4: Use object A and object B to produce object D; and
  Step 5: Use object D and object C to produce object E.
In this manner, each step representing an independent action is sequentially performed although steps 2 and 3 do not have prerequisite actions that are required to enable each of these steps and step 4 does not require step 3 to enable it. If, for example, the only action selected is step 4 to produce object D, then steps 1, 2 and 3 would be sequentially performed although step 3 is unnecessary to produce object D.

Other attempts to improve efficiency of a process or workflow comprising sequential steps have relied on the predetermined selective removal of unnecessary actions or steps in the process or workflow, which must be repeated each time an action is performed and/or may produce erroneous results due to the unintentional removal of necessary actions. In other words, these attempts fail to provide repeatability and reliability.

SUMMARY OF THE INVENTION

The present invention therefore, meets the above needs and overcomes one or more deficiencies in the prior art by providing systems and methods for reordering sequential actions in a process or workflow by determining which actions are required to enable another action in the process or workflow.

In one embodiment, the present invention includes a method for reordering multiple actions in a process or workflow, which comprises: i) selecting an action in the process or workflow to repeat; ii) determining each action in the process or workflow that is required to enable the selected action using a computer processor; and iv) reordering each action in the process or workflow that is required to enable the selected action.

In another embodiment, the present invention includes non-transitory program carrier device tangibly carrying computer-executable instructions for reordering multiple actions in a process or workflow, the instructions being executable to implement: i) selecting an action in the process or workflow to repeat; ii) determining each action in the process or workflow that is required to enable the selected action; and iv) reordering each action in the process or workflow that is required to enable the selected action.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like reference numerals, and in which.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other technologies. Moreover, although the term "step" may be used herein to describe different elements of methods employed, the term should not be interpreted as implying any particular order among or between various steps herein disclosed unless otherwise expressly limited by the description to a particular order.

Method Description

Figure 1:
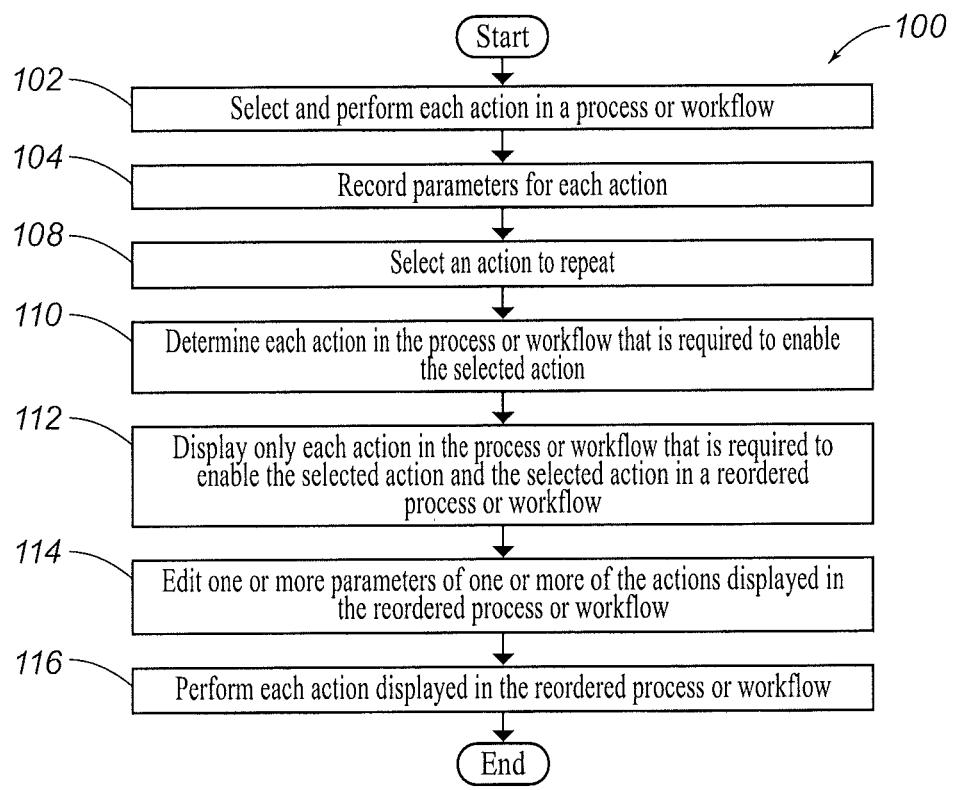
FIG. 1 is a flow diagram illustrating one embodiment of a method for implementing the present invention.

Referring now to FIG. 1, a flow diagram of one embodiment of a method 100 for implementing the present invention is illustrated. The method 100 determines a more efficient order of actions within a process or workflow based upon a selected action to repeat in the process or workflow and the actions that enable the selected action to be performed. The method 100 also considers modification of each action in the process or workflow before repeating the selected action.

Figure 4:
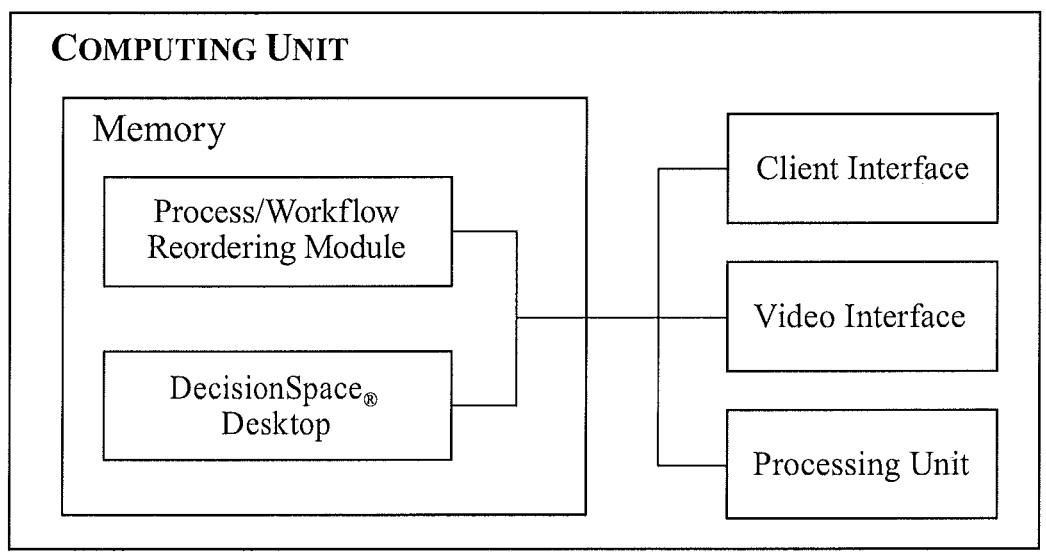
FIG. 4 is a block diagram illustrating one embodiment of a system for implementing the present invention.

In step 102, each action in a process or workflow is selected and performed using the client interface and/or the video interface described in reference to FIG. 4.

In step 104, the parameters for each action in the process or workflow are recorded such as, for example, the type of action performed, the time the action was performed, the input data (if any) that the action required, and the output data created or generated by the action.

In step 108, an action is selected from the process or a workflow to repeat using the client interface and/or the video interface described in reference to FIG. 4.

In step 110, each action in the process or workflow that is required to enable the selected action is determined. One embodiment of a method for implementing this step is further described in reference to FIG. 2.

In step 112, only each action in the process or workflow that is required to enable the selected action and the selected action are displayed in a reordered process or workflow using the client interface and/or the video interface described in reference to FIG. 4.

In step 114, one or more parameters of one or more of the actions displayed in the reordered process or workflow may be edited using the client interface and/or the video interface described in reference to FIG. 4. In this manner, one or more parameters of an action displayed in the reordered process or workflow may be edited to achieve a different result.

In step 116, each action displayed in the reordered process or workflow is performed.

Alternatively, steps 102 and 104 may be iteratively repeated for a single action in the process or workflow until an action is selected to repeat.

Figure 2:
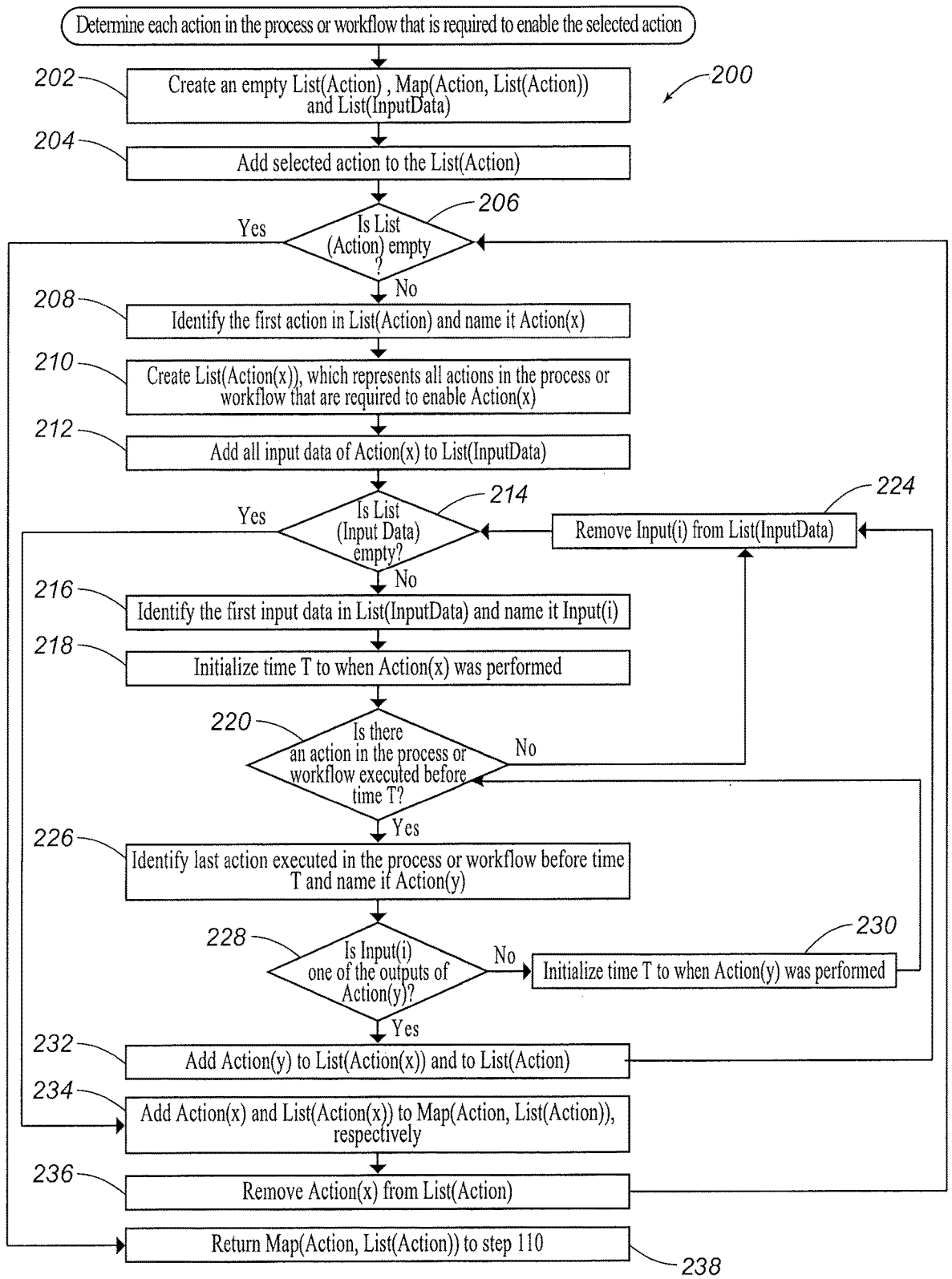
FIG. 2 is a flow diagram illustrating one embodiment of a method for implementing step 110 in FIG. 1.

Referring now to FIG. 2, one embodiment of a method 200 for implementing step 110 is illustrated.

In step 202, an empty List(Action), Map(Action, List (Action)) and List(InputData) are created using techniques well known in the art.

In step 204, the action selected in step 108 of the method 100 is added to List(Action).

In step 206, the method 200 determines if List(Action) is empty. If List(Action) is empty, then the method 200 proceeds to step 238. If List(Action) is not empty, then the method 200 proceeds to step 208.

In step 208, the first action in List(Action) is identified and named Action(x).

In step 210, List(Action(x)) is created using techniques well known in the art, which represents all actions in the process or workflow that are required to enable Action(x).

In step 212, all input data of Action(x) are added to List(InputData).

In step 214, the method 200 determines if List(InputData) is empty. If List(InputData) is empty, then the method 200 proceeds to step 234. If List(InputData) is not empty, then the method 200 proceeds to step 216.

In step 216, the first input data in List(InputData) is identified and named Input(i).

In step 218, a time T is initialized to when Action(x) was performed.

In step 220, the method 200 determines if there is an action in the process or workflow executed before time T. If there is an action in the process or workflow that is executed before time T, then the method 200 proceeds to step 226. If there is not an action in the process or workflow that is executed before time T, then the method proceeds to step 224.

In step 224, Input(i) is removed from List(InputData) and the method 200 returns to step 214.

In step 226, the last action executed in the process or workflow before time T is identified and named Action(y).

In step 228, the method 200 determines if Input(i) is one of the outputs of Action(y). If Input(i) is one of the outputs of Action(y), then the method 200 proceeds to step 232. If Input(i) is not one of the outputs of Action(y), then the method 200 proceeds to step 230.

In step 230, time T is initialized to when Action(y) was performed.

In step 232, Action(y) is added to List(Action(x)) and to List(Action), then the method 200 returns to step 224.

In step 234, Action(x) and List(Action(x)) are added to Map(Action, List(Action)), respectively. In this manner, Action(x) is mapped to Action and List(Action(x)) is mapped to List(Action).

In step 236, Action(x) is removed from List(Action) and the method 200 returns to step 206.

In step 238, Map(Action, List(Action)) is returned to step 110. In the conventional process or workflow described hereinabove with respect to the five actions represented by five sequential steps, Map(Action, List(Action)) would appear as illustrated in Table 1 below wherein the selected Action represented by step 5 requires the actions represented by steps 3 and 4 to enable it, the action represented by step 4 requires the actions represented by steps 1 and 2 to enable it and the actions represented by steps 1, 2 and 3 do not require any actions to enable them. In other words, the actions represented by steps 1, 2 and 3 require files as input that are external to the process or workflow and therefore, do not require actions to enable them.

TABLE 1

| Map (Action, List(Action)) | |
|---|---|
| 5 | 4, 3 |
| 4 | 1, 2 |
| 3 | 0 |
| 2 | 0 |
| 1 | 0 |

Figure 3:
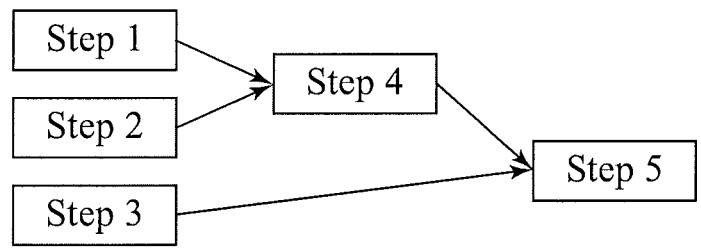
FIG. 3 is a flow diagram illustrating exemplary results of step 112 in FIG. 1.

Once Map(Action, List(Action)) is returned to step 110, the result may be displayed in step 112 in a reordered process or workflow as illustrated by the flow diagram in FIG. 3 representing the reordered process or workflow according to the example in Table 1. Steps 1, 2 and 3 therefore, may be performed at the same time, instead of in a sequential order, in order to maximize performance efficiency in the reordered process or workflow. Alternatively, steps 1 and 2 may be performed followed by the performance of steps 3 and 4, at the same time, and then step 5.

The method 220 therefore, enables more efficient repeatability of processes and/or workflows by removing unnecessary actions in the process or workflow that are not required to enable a selected action. In this manner, computer resources are less constrained. In addition, the new reordered process or work flow visually enables improved traceability of each action required to enable the selected action and the corresponding input data.

System Description

The present invention may be implemented through a computer-executable program of instructions, such as program modules, generally referred to software applications or application programs executed by a computer. The software may include, for example, routines, programs, objects, components and data structures that perform particular tasks or implement particular abstract data types. The software forms an interface to allow a computer to react according to a source of input. DecisionSpace® Desktop, which is a commercial software application marketed by Landmark Graphics Corporation, may be used as an interface application to implement the present invention. The software may also cooperate with other code segments to initiate a variety of tasks in response to data received in conjunction with the source of the received data. Other code segments may provide optimization components including, but not limited to, neural networks, earth modeling, history matching, optimization, visualization, data management, reservoir simulation and economics. The software may be stored and/or carried on any variety of memory such as CD-ROM, magnetic disk, bubble memory and semiconductor memory (e.g., various types of RAM or ROM). Furthermore, the software and its results may be transmitted over a variety of carrier media such as optical fiber, metallic wire, and/or through any of a variety of networks, such as the Internet.

Moreover, those skilled in the art will appreciate that the invention may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Referring now to FIG. 4, a block diagram illustrates one embodiment of a system for implementing the present invention on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the present invention described herein and illustrated in FIGS. 1-2. The memory therefore, includes process/workflow reordering module, which enables the methods illustrated and described in reference to FIGS. 1-2 and integrates functionality from the remaining application programs illustrated in FIG. 4. In particular, the process/workflow reordering module may be used to perform step 110 in FIG. 1. The memory also includes DecisionSpace® Desktop, which may be used as an interface application to perform steps 102-108 and 112-116 in FIG. 1. Although DecisionSpace® Desktop may be used as an interface application, other interface applications may be used, instead, or the process/workflow reordering module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well-known.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

The invention claimed is:

1. A method for reordering multiple actions in a process, the method comprising:
   selecting and performing, by a processing unit, each action in the process;
   recording, by the processing unit, parameters for each action in the process, the parameters including input data required to complete each action and output data generated by each action;
   selecting, by the processing unit, an action in the process to repeat;
   determining, by the processing unit and based on the parameters for each action, a subset of actions in the process that is required to enable the selected action by:
      generating a list in which the subset of actions is to be stored; and
      for each item of input data among a plurality of items of input data associated with the selected action:
         identifying a particular action in the process that generated the item of input data as an output; and
         adding the particular action to the list; and
   reordering, by the processing unit, the subset of actions that is required to enable the selected action.

2. The method of claim 1, wherein selecting and performing each action in the process comprises selecting and performing multiple sequential actions.

3. The method of claim 2, wherein reordering each action in the subset of actions in the process that is required to enable the selected action comprises reordering the multiple sequential actions to be multiple non-sequential actions.

4. The method of claim 1, further comprising displaying only each reordered action and the selected action in a reordered process.

5. The method of claim 4, further comprising editing a parameter of one of the actions displayed in the reordered process.

6. The method of claim 4, further comprising performing each action displayed in the reordered process.

7. The method of claim 1, wherein recording parameters for each action further comprises recording a type of action performed by each action in the process and a time each action in the process was performed, wherein determining the subset of actions in the process that is required to enable the selected action comprises:
   identifying the input data required to enable the selected action; and
   identifying each action in the process that generates the input data required to enable the selected action,
   wherein each action in the subset of actions that is required to enable the selected action is a required action, and
   wherein reordering each action in the subset of actions that is required to enable the selected action comprises determining each required action that requires another required action to be enabled.

8. The method of claim 7, wherein reordering each action in the subset of actions in the process that is required to enable the selected action further comprises:
   reordering each required action in the subset that does not require another required action to be enabled before each required action that requires another required action to be enabled; and
   reordering each required action in the subset that requires another required action to be enabled before the selected action.

9. The method of claim 8, wherein reordering each action in the subset of actions in the process that is required to enable the selected action further comprises reordering, at the same time, each required action in the subset that does not require another required action to be enabled.

10. The method of claim 8, wherein reordering each action in the subset of actions in the process that is required to enable the selected action further comprises reordering, at the same time, each required action in the subset that requires another required action to be enabled and each another required action that i) is not required to be enabled; and ii) is not required to enable each required action.

11. A non-transitory computer-readable medium in which instructions are stored, the instructions being executable by a processing device for causing the processing device to:
   select and perform each action in a process;
   record parameters for each action in the process, the parameters including input data required to complete each action and output data generated by each action;
   select an action in the process to repeat;
   determine a subset of actions in the process that is required to enable the selected action based on the parameters for each action by:
      generating a list in which the subset of actions is to be stored; and
      for each item of input data among a plurality of items of input data associated with the selected action:
         identifying a particular action in the process that generated the item of input data as an output; and
         adding the particular action to the list; and
   reorder the subset of actions that is required to enable the selected action.

12. The non-transitory computer-readable medium of claim 11, wherein the instructions for causing the processing device to select and perform each action in the process comprise causing the processing device to select and perform multiple sequential actions.

13. The non-transitory computer-readable medium of claim 12, wherein the instructions for causing the processing device to reorder each action in the subset of actions in the process comprise causing the processing device to reorder the multiple sequential actions to be multiple non-sequential actions.

14. The non-transitory computer-readable medium of claim 11, wherein the instructions are executable for causing the processing device to display only each reordered action and the selected action in a reordered process.

15. The non-transitory computer-readable medium of claim 14, wherein the instructions are executable for causing the processing device to edit a parameter of one of the actions displayed in the reordered process.

16. The non-transitory computer-readable medium of claim 14, wherein the instructions are executable for causing the processing device to perform each action displayed in the reordered process.

17. The non-transitory computer-readable medium of claim 11, further comprising instructions that are executable by the processing device for causing the processing device to:
   record parameters for each action by recording a type of action performed by each action in the process and a time each action in the process was performed; and
   determine the subset of actions in the process that is required to enable the selected action by:
      identifying the input data required to enable the selected action; and
      identifying each action of the process that generates the input data required to enable the selected action, wherein each action of the subset of actions that is required to enable the selected action is a required action, and wherein reordering each action in the subset of actions that is required to enable the selected action comprises determining each required action that requires another required action to be enabled.

18. The non-transitory computer-readable medium of claim 17, further comprising instructions that are executable by the processing device for causing the processing device to reorder each action in the subset of actions by:

reordering each required action that does not require another required action to be enabled before each required action that requires another required action to be enabled; and reordering each required action that requires another required action to be enabled before the selected action.

19. The non-transitory computer-readable medium of claim 18, further comprising instructions that are executable by the processing device for causing the processing device to reorder, at the same time, each action in the subset of actions that is required to enable the selected action further by reordering each required action that does not require another required action to be enabled.

20. The non-transitory computer-readable medium of claim 18, further comprising instructions that are executable by the processing device for causing the processing device to reorder, at the same time, each action in the subset of actions by reordering each required action that requires another required action to be enabled and each another required action that i) is not required to be enabled; and ii) is not required to enable each required action.

* * * * *